June 12, 1956     K. H. BURGSMÜLLER     2,749,808
THREAD CHASING
Filed July 13, 1951
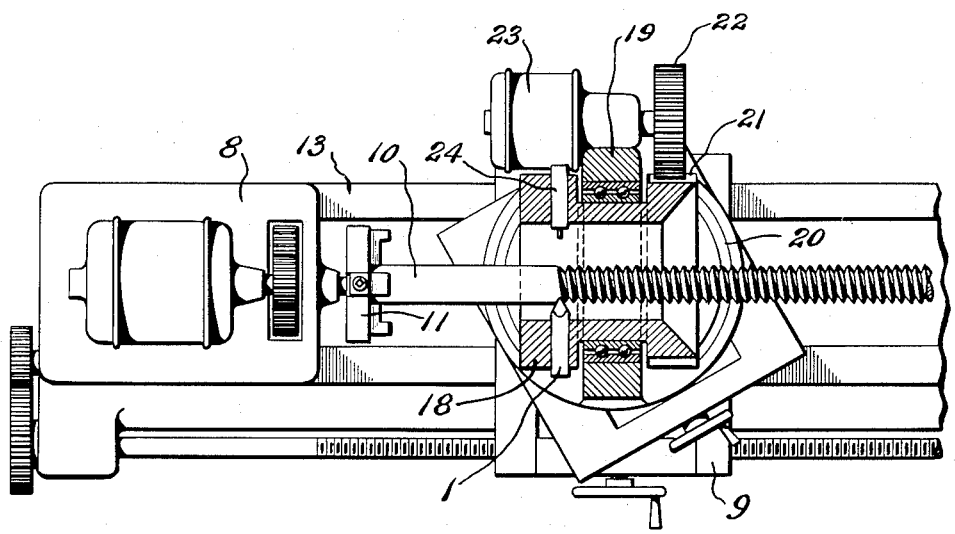
INVENTOR.
KARL HEINRICH BURGSMÜLLER
BY *James J. Cannon*
ATTORNEY

United States Patent Office 2,749,808
Patented June 12, 1956

2,749,808
THREAD CHASING

Karl Heinrich Burgsmüller, Kreiensen am Harz, Niedersachsen, Germany, assignor to Gomerue Establishment, Vaduz, Liechtenstein Application July 13, 1951, Serial No. 236,609

1 Claim. (Cl. 90—11.64)

This invention relates to certain improvements in or relating to the manufacture of threads by chasing.

In the machining of steel and other solid materials by cutting, it is customary to employ either multi-point or single-point tools of high-speed tool steel for the making of threads, especially V-threads. However, since in the machining of steel or other solid material the well known cutting alloys of the carbide type have been generally used in an increased measure, there has been a tendency of utilizing the advantages of these hard cutting alloys also in the field of thread cutting.

Thus it was attempted to equip the multi-point revolving thread milling cutter, with cutting alloy tips and to have it operate at a correspondingly higher speed, under otherwise similar conditions as the conventional cutter.

All these attempts, however, failed, because the extremely brittle tool nose broke right at the beginning of the work. It became the accepted opinion that the cutting alloys of the brittle type would not endure a prolonged intermittent cut.

Attempts to equip the simpler single-point, tool with a cutting alloy tip of a brittle and hard quality type for use as a stationary, continual thread cutting tool, also failed entirely.

Therefore, in cutting threads, high-speed steels could not be replaced by the hard and brittle cutting alloys. Sometimes a less brittle cutting alloy was used which however, permitted cutting speeds so low that hardly any advantage could be claimed, as compared to high-speed steel.

In research work done by the applicant concerning the cause of the destruction of the hard alloy tool tip it was found that the breakage of the tip is not caused by the continuous interruptions of the cut but tends to increase as the difference of the cutting strain on the two flanks of the tool tip is decreasing. In fact the researches revealed that the tip breakage is a minimum if one flank only of the hardfaced tool tip is doing the entire cutting work, while the other flank is relieved from any cutting work.

Based on these researches the present invention comprises the cutting of threads by means of a chasing tool in such a manner that a chasing tool tipped with a cutting alloy of a hard and brittle quality is fed in the direction of one of the flanks of the thread during all "passes" except the last one when it is fed in the direction of the other flank of the thread, so as to obtain a thread with two perfectly smooth flanks in spite of the single flank cutting.

In this connection it is possible to let the one stressed flank of the tool tip cut to the same depth as known in high-speed tool steel practice and use cutting speeds corresponding to those of the conventional surface cutting with cutting alloy of brittle quality contrary to all previous practices.

In carrying out my novel method it is preferred to move the chasing tool towards the workpiece in a continuous curve at a relatively high velocity in proportion to the rotational speed of the workpiece, in such a way that it strikes the workpiece intermittently and in rapid succession carrying out each time a short cut only which is continued during the next passage or strike, after the tool has passed through a relatively long cooling path through the air following each strike.

In producing external threads, of a nominal diameter this can be achieved by causing the chasing tool to circle around the workpiece on a course which is eccentric to the workpiece and intersects with the same tangential. In producing internal threads, the chasing tool may be caused to circle on a course which is eccentric to the workpiece so as to intersect same on a tangential line.

In the making of external threads of particularly large size, the chasing tool is advantageously caused to swing intermittently towards, and away from, the workpiece in a reciprocating motion in rapid succession. In this case the reciprocating chasing tool may be moved in a continuous curve and the part which forms the cutting course passes in a tangential line through the workpiece. Here it is also possible to carry out the reciprocating motion of the chasing tool in a continuous curve and the part which forms the cutting section is shaped so as to conform to the curvature of the threaded surface being made.

Moreover, I prefer to control the chasing tool, on its cutting course, in such a way that different sections of its cutting edge are continuously subjected to the action of the cutting pressure and to heating.

This may be achieved, for example by moving the chasing tool through the workpiece in such a way that the chip is removed from the workpiece at a continuously varying angle.

It is also possible to move the chasing tool through the cutting course at a variable speed.

Also a method of achieving one of the objects of my invention is by moving the chasing tool in such a way that the cross section of the chip being removed is continuously changing.

A further advantage can be secured in carrying out my novel process is by moving the chasing tool through its idle path at a speed which is higher than the one during the cutting course.

In order to produce the single flank cutting with a revolving chasing tool, the said chasing tool may be caused to revolve about an axis which is included relative to the axis of the workpiece.

In this case the angle between the axis of the workpiece and the circular course of the tool tip, may be made equal to the helix angle of the thread to be produced. Said tool tip is ground to conform with the profile of the thread to be made.

Other and further objects, features and advantages of the invention will be pointed out hereinafter and appear in the appended claims forming part of the application.

In the accompanying drawing several embodiments of the invention are shown by way of illustration only and not by way of limitation.

The figure is a plan view of the embodiment of a device for the making of external threads.

According to the figure a shaft 10 is held in a lathe and set in slow rotation. The said shaft is surrounded by a tool holder ring 18 for receiving the chasing tool 1 and is mounted eccentrically to the shaft 10 in a bearing 19 secured on a swivel plate 20 of the lathe carriage. Moreover, the ring 18 includes a gear 21 meshing with a pinion 22 of a motor 23 mounted on the swivel plate 20. By this driving arrangement the tool holder ring 18 with the chasing tool 1 can be set in rapid rotation.

When the device is being driven, the chasing tool 1 will circle around the workpiece 10 in such a way that it strikes the same at one point of the circumference, continuing the respective cut by the next strike to the adjacent point.

Because the curvature of the circular path of the chasing tool 1 conforms substantially to the circumference of the workpiece 10 there are practically no tool marks made between the individual cuts and no further finishing is required.

In addition to the chasing tool 1 a clearance cutting tool 24 may be clamped in the tool holder ring 18 as shown in the figure.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claim.

What I claim is:

The method for cutting threads on a workpiece as herein described, comprising the steps of relatively slowly rotating said workpiece about its longitudinal axis, said rotation controlling the amount of feed for said thread cutting operation, and relatively rapidly rotating a tool holder ring with a cutting tool and a clearance cutting tool, eccentrically around said workpiece, said tools engaging said workpiece intermittently and alternately over a small portion only of said workpiece removing from said workpiece short chips of variable cross-section with each revolution of said tool holder ring, said tools circling around said workpiece and striking said workpiece each at a point on the circumference of said workpiece and continuing said respective cuts by the next strike to the respective adjacent points during the following revolutions around said workpiece, said clearance cutting tool precutting the groove of said thread being cut, thereby reducing the cross-section of said chips to be removed by said cutting tool, thus relieving strains and stresses on said cutting tool during its finishing operation, as the curvature of the circular path of said cutting tool conforms substantially to the circumference of said workpiece, practically no tool marks are made between the individual cuts therefore no further finishing is required.

References Cited in the file of this patent

UNITED STATES PATENTS

| | | |
|---|---|---|
| 1,507,235 | Hall | Sept. 2, 1927 |
| 1,888,792 | Cottrell | Nov. 22, 1932 |
| 2,691,921 | Burgsmüller | Oct. 19, 1954 |

FOREIGN PATENTS

| | | |
|---|---|---|
| 43,802 | Switzerland | Mar. 23, 1908 |
| 491,956 | France | Feb. 25, 1919 |
| 665,486 | Germany | Sept. 27, 1938 |

OTHER REFERENCES

Engineering Workshop, pages 268, 269, 270, vol. 1, reprinted 1948. (TU 1160, J8, 1947).